(12) United States Patent
Ran et al.

(10) Patent No.: US 9,119,345 B2
(45) Date of Patent: Sep. 1, 2015

(54) POWER CUTTING TOOL WITH WHEEL ASSEMBLY

(75) Inventors: Yuanzhong Ran, Suzhou (CN); Yu Zhang, Suzhou (CN)

(73) Assignee: POSITEC POWER TOOLS (SUZHOU) CO. LTD., Jiangsu Province (CN)

( * ) Notice: Subject to any disclaimer, the term of this patent is extended or adjusted under 35 U.S.C. 154(b) by 0 days.

(21) Appl. No.: 13/586,832

(22) Filed: Aug. 15, 2012

(65) Prior Publication Data

US 2013/0186051 A1 Jul. 25, 2013

(30) Foreign Application Priority Data

Jan. 20, 2012 (CN) .......................... 2012 1 0018364
Jul. 27, 2012 (CN) .......................... 2012 1 0263972

(51) Int. Cl.
| | | |
|---|---|---|
| A01D 15/00 | (2006.01) | |
| A01D 21/00 | (2006.01) | |
| A01D 23/00 | (2006.01) | |
| A01D 27/00 | (2006.01) | |
| A01D 34/00 | (2006.01) | |
| A01D 34/84 | (2006.01) | |
| A01D 34/416 | (2006.01) | |
| A01D 34/90 | (2006.01) | |

(52) U.S. Cl.
CPC .............. A01D 34/84 (2013.01); A01D 34/416 (2013.01); A01D 34/902 (2013.01)

(58) Field of Classification Search
CPC ..... A01G 3/062; A01D 34/84; A01D 34/416; A01D 43/16
USPC .............. 172/15, 17, 14, 41, 42, 13; 56/12.7, 56/16.9, 17.1, 256; D15/28, 17; D8/1, 8; 30/276, 275.4, 228

See application file for complete search history.

(56) References Cited

U.S. PATENT DOCUMENTS

| | | | | |
|---|---|---|---|---|
| 2,653,381 A | * | 9/1953 | Rooke | 30/228 |
| 2,672,002 A | * | 3/1954 | Nelson | 56/16.9 |
| 2,708,335 A | * | 5/1955 | Newton | 56/12.7 |
| 2,827,748 A | * | 3/1958 | Simpson | 56/16.9 |
| 2,832,184 A | * | 4/1958 | Beuerle | 56/17.2 |
| 3,018,602 A | * | 1/1962 | Diesterweg | 56/295 |
| 3,561,199 A | * | 2/1971 | Lay | 56/17.1 |
| 3,625,292 A | * | 12/1971 | Lay | 172/13 |
| 3,627,054 A | * | 12/1971 | Lay | 172/14 |

(Continued)

FOREIGN PATENT DOCUMENTS

| | | |
|---|---|---|
| CN | 2704997 | 6/2005 |
| CN | 2760939 | 3/2006 |

(Continued)

*Primary Examiner* — Árpád Fábián-Kovács (57) ABSTRACT

A power cutting tool includes a housing, a motor accommodated in the housing, a cutting assembly optionally operated in a trimming mode or in an edging mode and being driven by the motor to rotate around a first axis, a handle assembly, an elongated shaft connecting the cutting assembly and the handle assembly, a guard mounted to the cutting assembly, and a wheel assembly including a wheel. The wheel assembly is optionally mounted at least a first mounting position and a second mounting position. The central axis of the wheel is substantially perpendicular to the first axis when the wheel assembly is mounted at the first mounting position and is substantially parallel to the first axis when the wheel assembly is mounted at the second mounting position.

19 Claims, 9 Drawing Sheets

(56) References Cited

U.S. PATENT DOCUMENTS

| | | | | |
|---|---|---|---|---|
| 3,627,055 A | * | 12/1971 | Lay | 172/14 |
| 4,364,435 A | * | 12/1982 | Tuggle et al. | 172/15 |
| 4,463,544 A | * | 8/1984 | Carsello et al. | 56/17.1 |
| 4,679,385 A | * | 7/1987 | Carmine | 56/16.9 |
| 4,712,363 A | * | 12/1987 | Claborn | 56/16.7 |
| 4,756,148 A | * | 7/1988 | Gander et al. | 56/17.2 |
| 4,803,831 A | * | 2/1989 | Carmine | 56/16.9 |
| 4,845,929 A | * | 7/1989 | Kawasaki et al. | 56/17.5 |
| 4,914,899 A | * | 4/1990 | Carmine | 56/16.7 |
| 4,922,694 A | * | 5/1990 | Emoto | 56/16.7 |
| 5,029,435 A | * | 7/1991 | Buchanan | 56/12.1 |
| 5,226,486 A | * | 7/1993 | Naiser | 172/15 |
| 5,325,928 A | * | 7/1994 | Wagster et al. | 172/15 |
| 5,383,330 A | * | 1/1995 | Yokocho et al. | 56/256 |
| 5,407,012 A | * | 4/1995 | Klopfer | 172/15 |
| 5,490,371 A | * | 2/1996 | Potucek, III | 56/17.2 |
| D372,405 S | * | 8/1996 | Notaras et al. | D8/1 |
| 5,603,205 A | * | 2/1997 | Foster | 56/16.7 |
| 5,661,960 A | * | 9/1997 | Smith et al. | 56/12.7 |
| 5,918,683 A | * | 7/1999 | Abelsson et al. | 172/15 |
| D423,308 S | * | 4/2000 | Marshall et al. | D8/8 |
| D427,861 S | * | 7/2000 | Cooper et al. | D8/8 |
| 6,116,350 A | * | 9/2000 | Notaras et al. | 172/15 |
| 6,351,930 B1 | * | 3/2002 | Byrne | 56/12.7 |
| 6,363,699 B1 | | 4/2002 | Wang | |
| 6,581,246 B1 | * | 6/2003 | Polette | 16/429 |
| 6,659,188 B2 | * | 12/2003 | Takemoto et al. | 172/15 |
| 6,688,404 B2 | * | 2/2004 | Uhl et al. | 172/15 |
| 6,691,792 B2 | * | 2/2004 | Keane | 172/14 |
| 6,796,113 B2 | * | 9/2004 | Moore | 56/12.7 |
| 6,926,090 B2 | * | 8/2005 | Sergyeyenko et al. | 172/15 |
| 7,096,966 B2 | * | 8/2006 | Eberhardt et al. | 172/15 |
| 7,107,745 B2 | * | 9/2006 | Dunda | 56/12.7 |
| 8,176,989 B1 | * | 5/2012 | Ponomarenko | 172/17 |
| 2002/0184868 A1 | * | 12/2002 | Moore | 56/12.7 |
| 2008/0271325 A1 | * | 11/2008 | Hurley | 30/276 |
| 2009/0255695 A1 | * | 10/2009 | Breneman et al. | 172/15 |

FOREIGN PATENT DOCUMENTS

| | | |
|---|---|---|
| CN | 201609037 | 10/2010 |
| CN | 202040202 | 11/2011 |
| GB | 2430342 | 3/2007 |

* cited by examiner

POWER CUTTING TOOL WITH WHEEL ASSEMBLY

TECHNICAL FIELD

The present invention relates to a power cutting tool, and more particularly, to a grass trimmer with edging function.

DESCRIPTION OF PRIOR ART

Green plants are an essential environmental factor in the life of human beings. People are gradually paying more attention to deforestation. No matter whether they are golf courses, football fields, manors, yards of the villas, or common residential areas, green lawns everywhere bring vitality and vigor to human life. However, without trimming, these lawns grow out of order.

As an ideal gardening tool for trimming the lawns, the grass trimmer becomes a favorite of users, which also puts forward more and more strict requirements on the functions and comfort of the machine.

Common grass trimmers available on the market are usually provided with a wheel assembly on the working head as a support and a guide to meet users' needs on trimming and edging on a vertical plane or step surface; besides, to improve the comfort of the user, manufacturers have also mounted a wheel assembly on the guard of the grass trimmer to support the grass trimmer when the user trims the grass, which makes the operation easier.

As disclosed in CN patent No. ZL201020110814.8, it's a grass trimmer, taking these two user needs into consideration; both the working head and the guard are provided with a wheel such that the grass trimmer is supported and guided in both the trimming and edging modes, which reduces the fatigue of the user. However, the structure of this patent also has defects: the trimming functions and edging functions of the grass trimmer cannot be realized at the same time, so the other wheel is unnecessary in one of the modes, which on one hand increases the cost in production, manufacturing, and transportation, and on the other hand increases the weight of the grass trimmer and brings inconvenience to the user imperceptibly.

SUMMARY OF THE INVENTION

In one preferred embodiment, a power cutting tool includes a housing, a motor accommodated in the housing; a cutting assembly optionally operated in a trimming mode or in an edging mode and being driven by the motor to rotate around a first axis, a handle assembly, an elongated shaft connecting the cutting assembly and the handle assembly, a guard mounted to the cutting assembly, and a wheel assembly including a wheel. The wheel assembly is optionally mounted at least a first mounting position and a second mounting position. The central axis of the wheel is substantially perpendicular to the first axis when the wheel assembly is mounted at the first mounting position and is substantially parallel to the first axis when the wheel assembly is mounted at the second mounting position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF THE INVENTION

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views. Reference will now be made to the drawings to describe various embodiments in detail.

Figure 1:
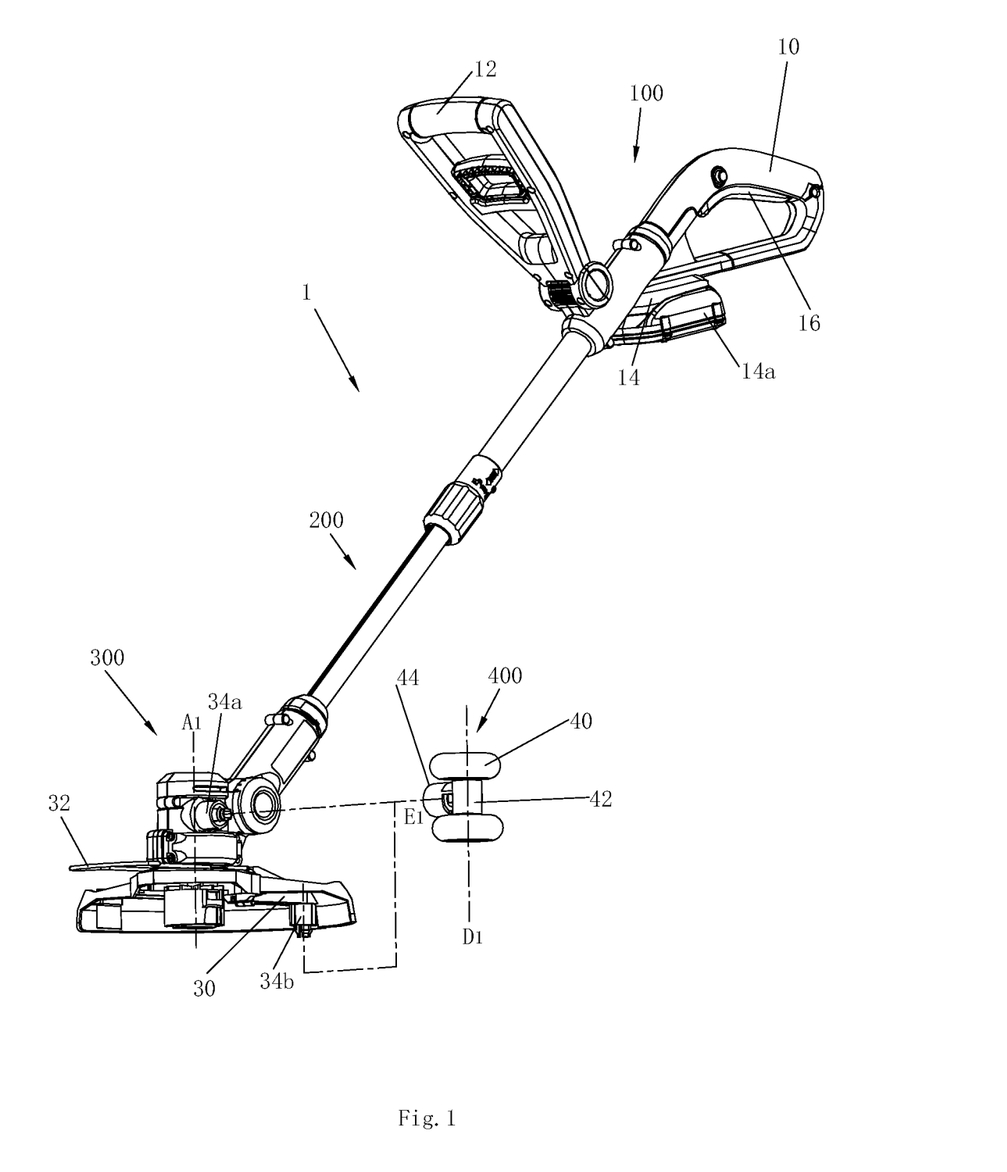
FIG. 1 is a perspective view of a grass trimmer having a wheel assembly according to a first embodiment of the present invention.

Please referring to FIG. 1, a grass trimmer 1 according to a first embodiment of the present invention comprises a working head 300, and an elongated operating shaft 200 which extends longitudinally. One end of the operating shaft 200 is provided with a handle assembly 100. In this embodiment, the handle assembly 100 comprises a main handle 10 and an auxiliary handle 12, wherein the main handle 10 is located at the end of the operating shaft 200, is approximately D-shaped, and has a hollow structure through which a user's hand can pass conveniently for holding. The auxiliary handle 12 is pivotally connected to one side opposite the main handle 10 so as to adjust the angle to make holding comfortable, such that the user can carry out the cutting operation with two hands holding this tool. During operation, the user can cut the grass and trim the edges with one hand holding the main handle 10 and the other hand holding the auxiliary handle 12, which is much easier than single-handed operation. Of course, the handle assembly may also have one handle in other embodiments. The operating shaft 200 is usually provided with a power source receiving device located at a position close to the handle assembly 100 for receiving a power source. In this embodiment, a DC grass trimmer 1 is provided with a battery pack connecting device 14 below the main handle 10 to adapt to a battery pack for supplying power to the grass trimmer. Of course, the power can also be obtained by installing a gasoline engine or connecting with alternating current via a power line. The main handle 10 is provided with an operating switch 16 for control of the start or stop of the grass trimmer 1.

The operating shaft 200 can usually be set to be extensible, and the length of an expansion link can be adjusted according to the height of the user so as to achieve a comfortable user experience. The other end, away from the handle assembly 100, of the operating shaft 200 is pivotally connected with the working head 300 via a clutch device (not shown in the figure). The working head 300 includes a housing, the housing of the working head 300 is provided with a motor inside (not shown in the figure). Driven by a motor, a grass cutting wire installed at the bottom of the working head 300 spins at a high speed around the longitudinal axis A1 of the working head to cut grass on the ground. To avoid accidental injury caused to the human body by the grass trimmer, the working head 300 is fixed with a guard 30. To avoid accidental damage of flowers during grass cutting, the working head is also provided with a flower protecting cable 32.

In this embodiment, to facilitate the movement and working guide of the grass trimmer 1, the grass trimmer is also equipped with a wheel assembly 400 which can be installed at different positions such that the wheel assemblies 400 can work as a supporting wheel not only in the trimming mode but also in the edging mode. Therefore, the guard 30 and working head 300 of the grass trimmer are respectively provided with a mounting base 34 (34a, 34b) for mounting the wheel assembly 400. The wheel assembly 400 is selectable to adapt to one of the two mounting bases 34 (34a, 34b), which satisfies the need of a supporting wheel in the trimming mode and the in the edging mode, avoids increasing the load on the grass trimmer 1 caused by installing two sets of wheel assemblies 400, and also reduces the manufacturing and transportation cost of the grass trimmer at the same time.

Figure 5:
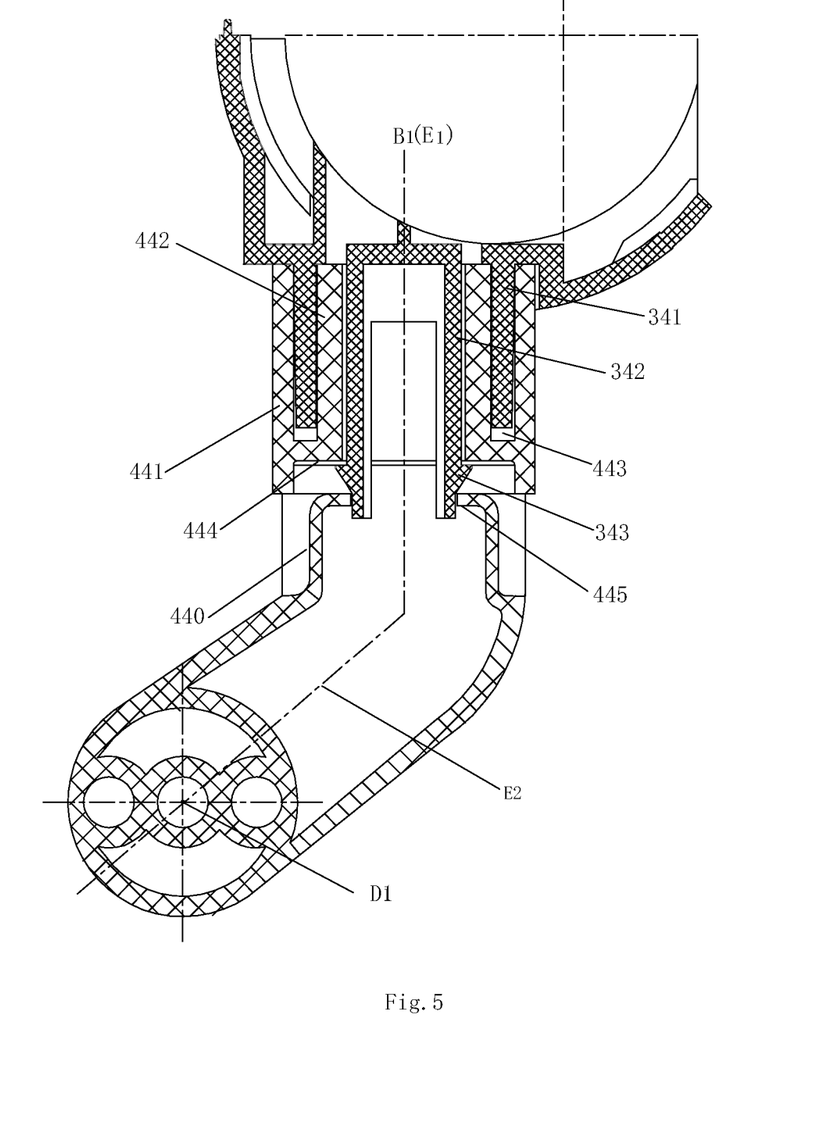
FIG. 5 is similar to FIG. 4, but the bracket of the wheel assembly being mounted to the mounting base.

The wheel assembly 400 comprises a pair of wheels 40 located in parallel and a bracket for fixing the wheels 40, wherein the bracket comprises a first bracket part 42 connected with the wheels 40 and a second bracket part 44 at a certain angle to the longitudinal axis D1 of the first bracket part 42. In this embodiment, the longitudinal axis E1 of the second bracket part 44 is vertical to the longitudinal axis D1 of the first bracket part 42 (as shown in FIG. 5), and the longitudinal axis D1 of the first bracket part 42 is coaxial with the rolling axis of the wheel. The wheel assembly 400 is set in such a way that the wheels 40 not only can roll around the longitudinal axis D1 of the first bracket part 42, but also drive the wheels 40 to spin around the longitudinal axis E1 of the second bracket part 44 when the second bracket part 44 revolves on its axis E1 circumferentially. In other words, the wheels 40 in this invention can realize 360° optional rotation on a horizontal ground in the trimming mode. When such wheel assembly 400 is adapted to the guard mounting base 34b and the guard mounting base 34b has no limit on the circumferential rotation of the second bracket part 44, the user can push the grass trimmer 1 in any direction to facilitate the movement and steering of the grass trimmer 1 to meet the demands on grass cutting in an indefinite area in a large scope. Of course, in other embodiments, the wheel assembly 400 may also have a common wheel and a common bracket.

Figure 2:
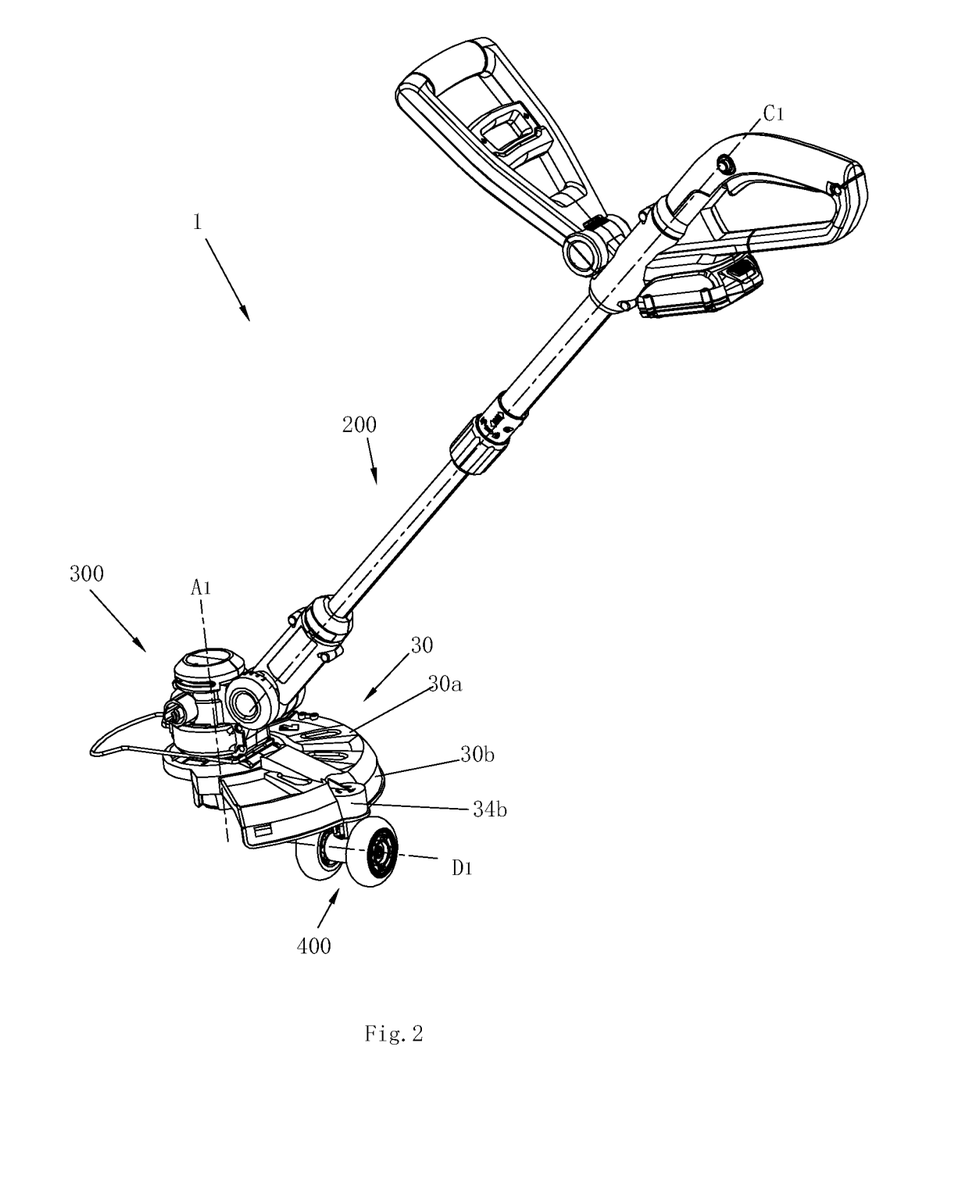
FIG. 2 is a perspective view of the grass trimmer of FIG. 1, the grass trimmer being operated in a trimming mode.

Referring to FIG. 2, when the wheel assembly 400 in the trimming mode is mounted on the guard mounting base 34b, the rolling axis D1 of the wheel is approximately vertical to the rotating axis A1 of the working head, and then the grass trimmer 1 cuts and trims the grass horizontally on the ground. The plants on the ground have different densities and the area to be processed is relatively scattered, the wheel assembly 400 with the features of the universal wheel, is mounted on the guard mounting base 34b such that the wheels 40 can realize 360° steering on horizontal ground, and then the grass trimmer can meet the requirements of working repeatedly in a specified area and moving in a large area.

The guard 30 comprises an arc guard surface 30a which extending in the radial direction respect to the rotating axis A1 of the working head, and a surrounding surface 30b extending from the guard surface 30a and at an angle to the guard surface 30a, wherein the guard mounting base 34b is mounted at the surrounding surface 30b. Preferably, the guard mounting base 34b is mounted at a position on a plane determined by the longitudinal axis C1 of the operating lever and the longitudinal axis A1 of the working head. In such a way, when the grass trimmer 1 requires moving at a long distance, the balance can be controlled easily to avoid increasing the load on the user caused by swaying of the grass trimmer.

Figure 3:
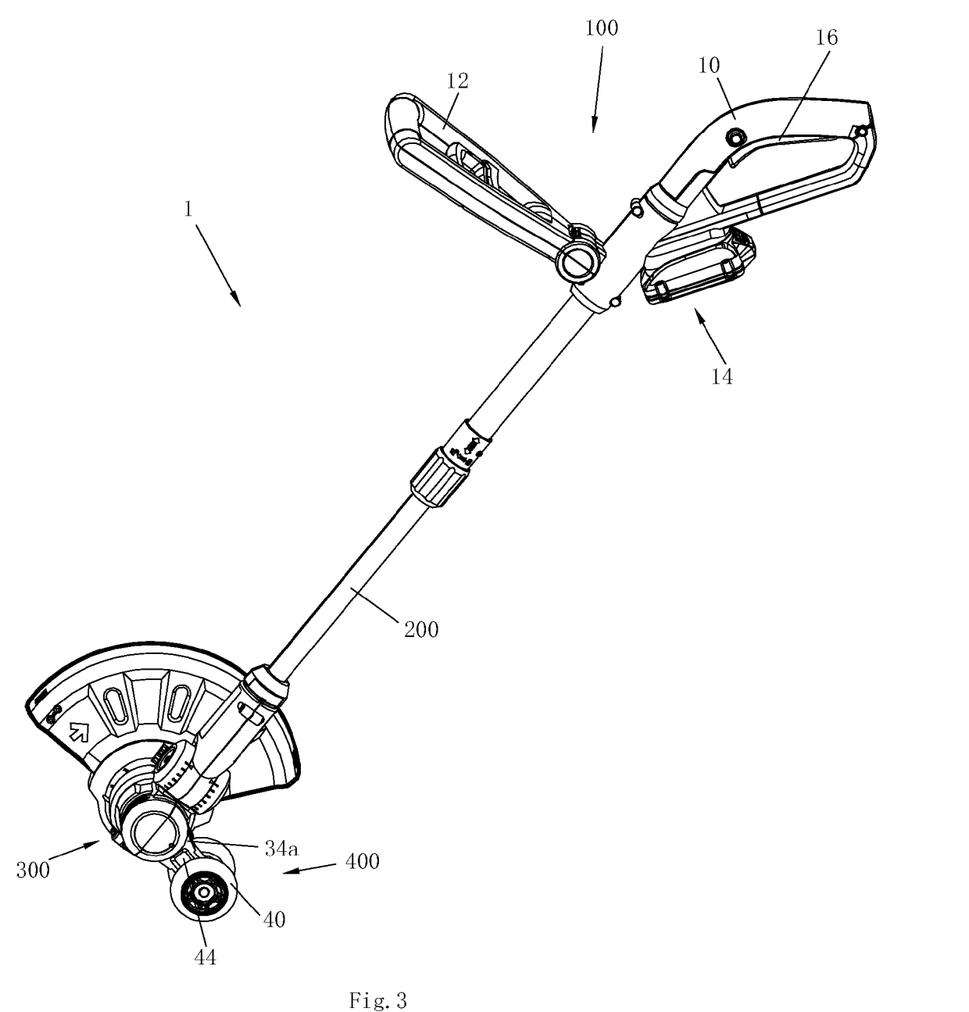
FIG. 3 is a perspective view of the grass trimmer of FIG. 1, the grass trimmer being operated in an edging mode.

As shown in FIG. 3, the wheel assembly 400 in the edging mode is mounted on the housing mounting base 34a; meanwhile, the operating shaft 200 rotates at a certain angle with respect to the working head 300 at the same time, and the handle assembly 100 is rotated to a suitable holding angle with respect to the operating shaft 200. Preferably, the longitudinal axis C1 of the operating lever is approximately at an angle of 45 degrees to the ground. At this moment, the rolling axis D1 of the wheel is approximately parallel to the rotating axis A1 of the working head, and the grass trimmer 1 executes the trimming operation on a vertical plane. The user can push the grass trimmer 1 to trim the edge along the wall corner or road side. Different from the optional steering in the trimming mode, the grass trimmer 1 in the edging mode usually moves along a fixed route, so when the grass trimmer is provided with the wheel assembly 400 with the features of the universal wheel. Preferably, a structure for limiting the circumferential rotation of the second bracket is arranged between the housing mounting base 34a and the second bracket part 44.

Figure 4:
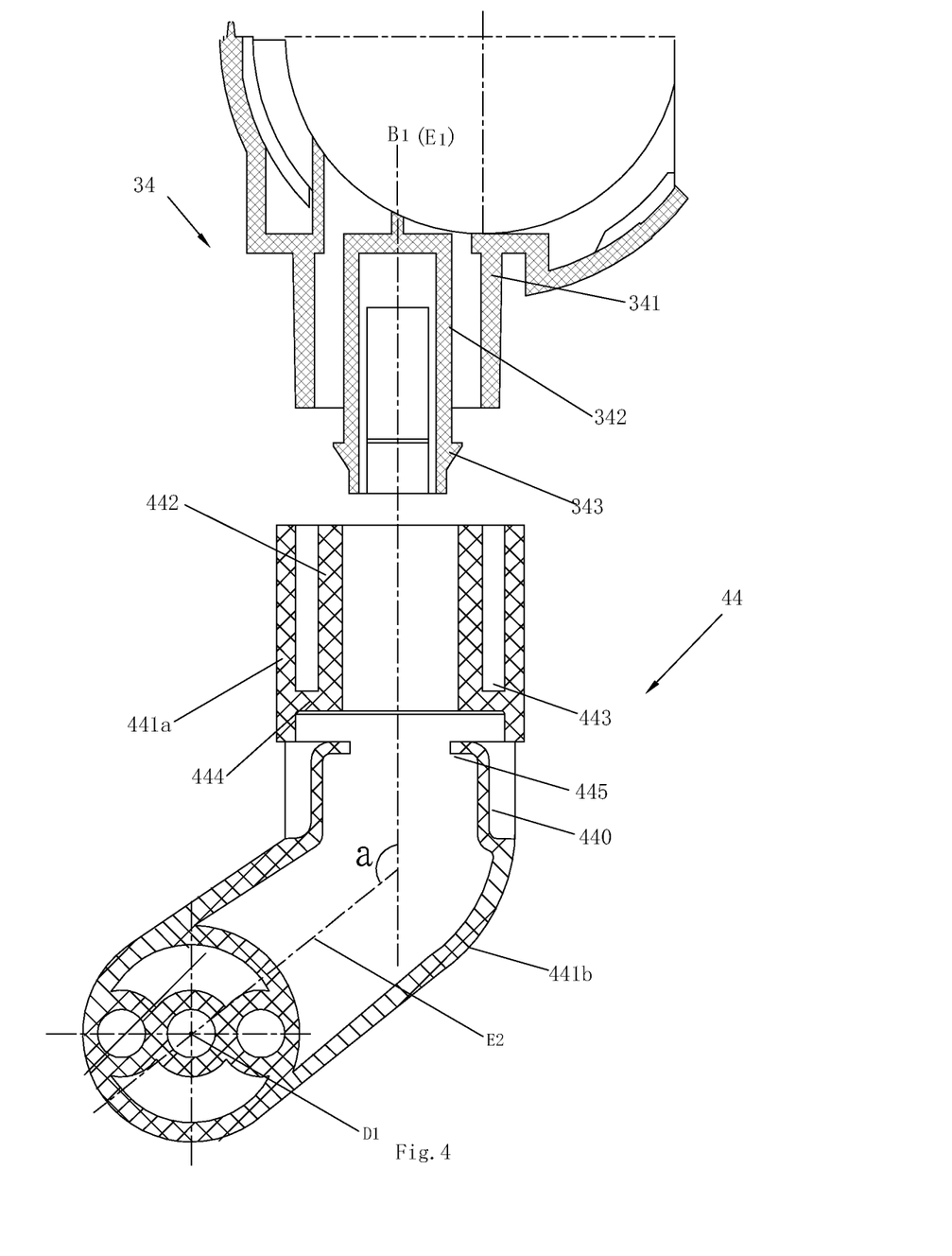
FIG. 4 is a schematic cross-sectional view of a bracket of the wheel assembly and a mounting base for attaching the wheel assembly.

To connect the wheel assembly 400 to the housing mounting base 34a or the guard mounting base 34b, it is called the wheel mounting base 34 below. A fixing element is arranged between the second bracket part 44 of the wheel assembly 400 and the wheel mounting base 34. The fixing element comprises an axial fixing configuration through which the second bracket part 44 is connected to the mounting base 34 immovably along its axial direction. This invention has the following embodiments of the axial fixing configuration:

As shown in FIG. 4 and FIG. 5, the second bracket part 44 of the wheel assembly 400 is set into a sleeve 441. The sleeve 441 is set into a first part 441a and a second part 441b at an angle along its extension direction, wherein the second part 441b is connected with the first bracket part 42; the first part 441a is used to be adapted to the mounting base 34; and the angle between the longitudinal axis E1 of the first part 441a and the longitudinal axis E2 of the second part 441b is preferably 135 degrees. The first part 441a of the sleeve 441 is provided with a hollow inner cylinder 442 inside. The sleeve 441 and the inner cylinder 442 are connected via a step 444, and a cylindrical slot 443 is formed between the sleeve 441 and the inner cylinder 442. The first part 441a of the sleeve 441 is provided with a manual pressing portion 440 located at a position close to the step 444. The pressing portion 440 is provided with a pressing strip 445 on the inner side of the sleeve 441. In the first embodiment, the axial fixing configuration comprises a cylindrical mounting base wall 341 arranged at the mounting base 34 and an elastic strip 342 arranged in the mounting base wall 341; the elastic strip 342 and the mounting base wall 341 are coaxially arranged; the position, close to the free end, of the elastic strip 342 is provided with an elastic wedge 343; meanwhile, the axial fixing configuration also comprises the cylindrical slot 443 and the step 444 formed between the sleeve 441 and the inner cylinder 442. The number of the pressing strip 445 is equal to that of the elastic strip 342, preferably 2.

During installation, the hollow inner cylinder 442 of the second bracket part 44 of the wheel assembly 400 is aligned with the position of the elastic strip 342 first, and then the elastic strip 342 is inserted into the hollow inner cylinder 442 along with the direction of the mounting base axis B1; the inner cylinder 442 of the second bracket part 44 crosses the wedge 343 on the elastic strip 342 to make the elastic strip 342 yield to the mounting base axis B1 until the wedge 343 on the elastic strip is elastically reset and locked on the step 444. At this moment, the mounting base wall 341 is just completely embedded into the cylindrical slot 443; the mounting base wall 341 is completely wrapped by the first part 441a of the sleeve 441 of the second bracket; and the wheel assembly 400 is firmly fixed on the mounting base 34, axially motionless. In such a way, the wheel assembly 400 can be connected to the wheel mounting base 34 conveniently and quickly. And after mounting, the wheel assembly 400 and the mounting base 34 are very compactly jointed to avoid the wheel assembly 400 accidentally disengaging from the engagement with the mounting base 34. Certainly, if the wheel assembly 400 is required to be dismantled from the mounting base 34a and then mounted on the other mounting base 34b, the pressing portion 440 is operated to make the elastic strip 342 which is in contact with the pressing strip 445 yield towards the mounting base axis B1 until the wedge 343 is separated from the step 444, and then the second bracket part 44 can be held to easily take down the wheel assembly 400 from the mounting base 34.

In the above mentioned embodiment, the axial fixing configuration arranged between the mounting base and the second bracket can be replaced, which means that the elastic strip and the wedge are arranged on the second bracket, while the bottom wall and the pressing strip are arranged on the mounting base, so the axial fixing configuration can also realize quick mounting and dismantling of the wheel assembly.

Figure 6:
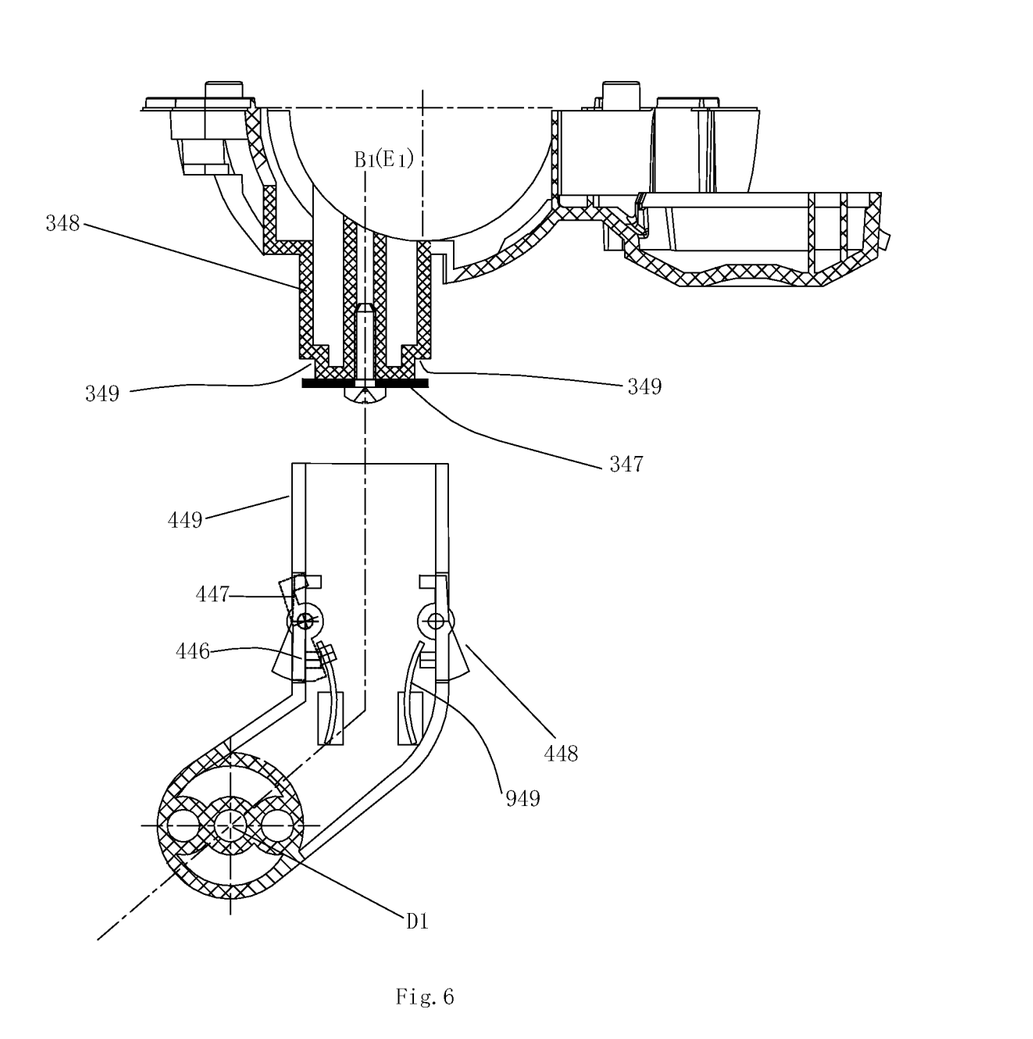
FIG. 6 is a schematic cross-sectional view of a wheel assembly and a mounting base of a grass trimmer according to a second embodiment of the present invention.
Figure 7:
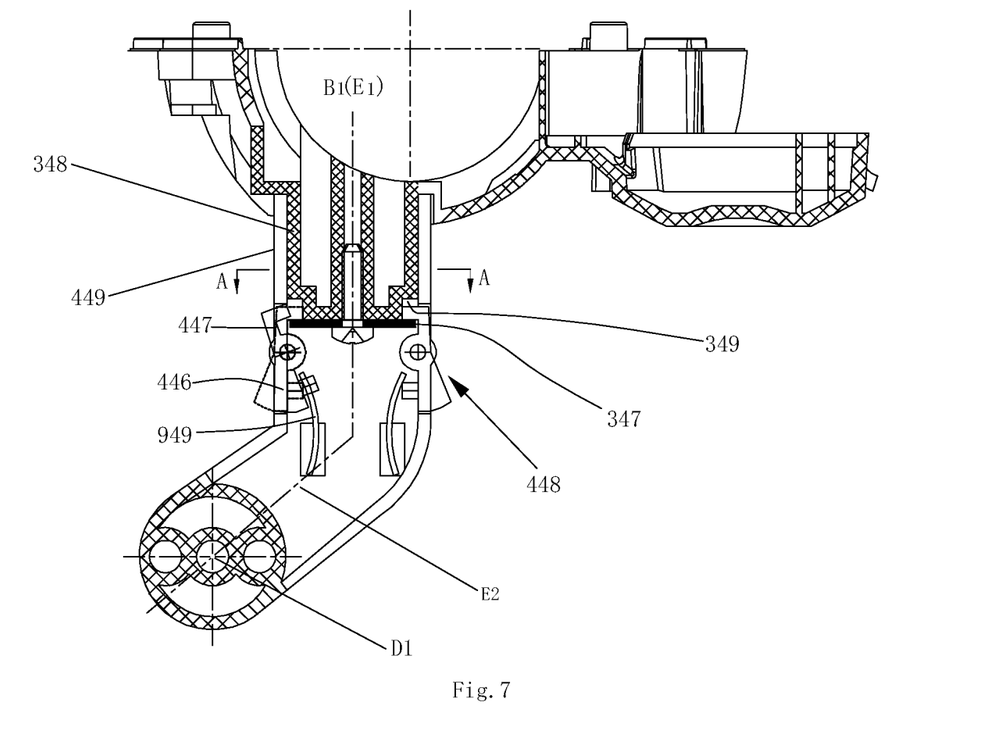
FIG. 7 is similar to FIG. 6, but the bracket of the wheel assembly being mounted to the mounting base.

When the wheel assembly 400 is connected to the mounting base 34 according to the above mentioned method, the wheel assembly 400 cannot axially move along the mounting base axis B1 with respect to the mounting base 34; however, the radial rotation of the wheel assembly 400 with respect to the mounting base axis B1 cannot be limited, which means that after being mounted on the mounting base 34 via the axial fixing configuration, the wheel assembly 400 can circumferentially revolve on its axis with respect to the longitudinal axis E1 of the second bracket. Such mounting method is suitable for the trimming mode, so the wheels 40 can rotate optionally on the ground. As shown in FIGS. 6 and 7, in a second embodiment of the present invention, the mounting base 34 has an outer circumferential wall 348 recessed in a stepped manner. The free end of the outer circumferential wall 348 is provided with a gasket 347, and an annular groove 349 is formed between the gasket 347 and the outer circumferential wall 348. The sleeve 449 of the second bracket part 44 is provided with an elastic clamp 448 which comprises a clamping end 447 and an operating end 446. The clamping end 447 can be releasably engaged with the annular groove 349 via the operating end 446. The axial fixing configuration according to a second embodiment comprises an annular groove 349 located on the outer circumferential wall 348 of the mounting base 34 and the elastic clamp 448 located on the sleeve 449 of the second bracket part 44. The sleeve 449 is provided with an elastic strip 949 inside. The operating end 446 is pressed against the elastic strip 949. In its natural state, the elastic strip 949 bends towards the direction away from the longitudinally axis E1 of the second bracket to press the operating end 446 such that the clamping end 447 extends to the inner side of the sleeve 449 of the second bracket, e.g. the position of the elastic clamp 448 marked by the full line in the FIG. 6. Preferably, the diameter of the gasket 347 is identical with the maximum diameter of the outer circumferential wall 348. The gasket 347 is connected to the outer circumferential wall 348 by a rivet or screw threads. Of course, the annular groove 349 may also be integrally formed by the outer circumferential wall 348 recessing inwards along the mounting base 34. The number of the elastic clamp 448 is at least 1, preferably 2 in this embodiment, arranged on the sleeve 449 of the second bracket in the radial direction.

When the wheel assembly 400 is required to be mounted on the mounting base 34, the acting force of the elastic strip 949 shall be overcome first and then the operating end 446 is pressed such that the clamping end 447 moves out of the sleeve 449 from the position on the inner side of the sleeve 449, e.g. the position of the elastic clamp 448 marked by the dotted line in the FIG. 6; then the sleeve 449 of the second bracket is moved to its root along with the outer circumferential wall 348 of the mounting base 34 until the sleeve 449 of the second bracket completely guards the mounting base 34; at this moment, the operating end 446 is released, and then the clamping end 447 re-extends into the sleeve 449 of the second bracket under the action of the releasing force of the elastic strip 949 and is engaged with the annular groove 349 of the mounting base 34. Thus, the wheel assembly 400 can be quickly adapted to the mounting base 34. Due to the adaptation of the elastic clamp 448 and the annular groove 349, the wheel assembly 400 and the mounting base 34 are solidly connected and axially immovable. Of course, when the wheel assembly 400 is required to be dismantled, only two fingers are needed to press the opening end 446 of the elastic clamp 448 such that the clamping end 447 moves out of the annular groove 349, and then the second bracket part 44 moves towards the direction away from the root along with the outer circumferential wall 348 of the mounting base 34.

In the second embodiment, the axial fixing configuration arranged between the mounting base 34 and the second bracket part 44 may also be arranged in an interchange way, which means that the elastic clamp is arranged on the sleeve of the mounting base 34, while the annular groove is arranged at a position, corresponding to the elastic clamp, of the second bracket. Such axial fixing configuration also can realize the quick dismantling of the wheel assembly and achieve the same effect as the above embodiment.

No matter which axial fixing configuration in the above embodiments is adopted, the wheel assembly 400 can be quickly assembled on the wheel mounting base 34, and the assembled wheel assembly 400 and mounting base 34 are restricted in the axial direction and are firmly connected and difficult to disengage from the engagement. The wheel assembly 400 can be operated by the user to quickly disengage from the engagement with the mounting base 34 until the working mode is required to be shifted. Of course, the axial fixing configuration is not limited to the above embodiments. The second bracket part 44 and the mounting base 34 of the wheel assembly also can realize axial fixation by other dismountable ways which are omitted here.

The axial fixing configuration in the above mentioned embodiment has no limit on the rotation of the second bracket part 44 around its own longitudinal axis E1, so the wheels 40 can steer optionally in the grass cutting and edging modes, in particular in the trimming mode. To facilitate the wheels 40 conducting its single-side guide function in the edging mode, preferably, the fixing configuration also comprises a circumferential fixing configuration for limiting the circumferential rotation of the second bracket part 44 on the basis of the axial fixing configuration.

Figure 8:
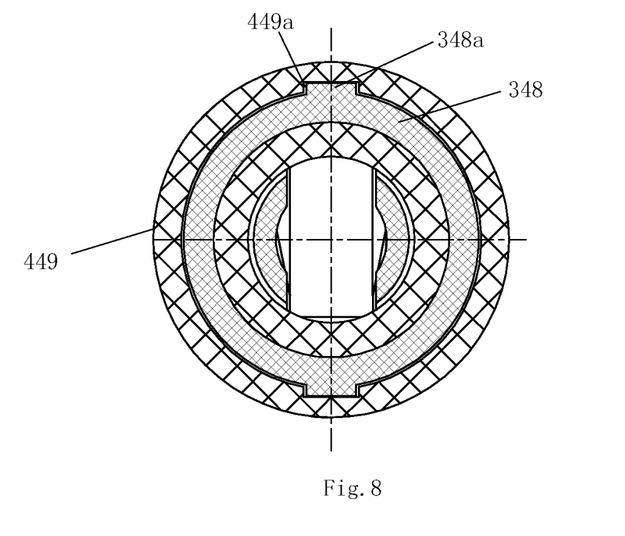
FIG. 8 is a cross-sectional view along the A-A line of FIG. 7.

Further as shown in FIG. 8, after the wheel assembly 400 is installed on the mounting base 34, the circumferential rotation of the wheel assembly 400 with respect to the longitudinal axis E1 of the second bracket is to be limited, the fixing element comprises a circumferential fixing configuration for limiting the rotation of the wheel assembly around the central axis of the second bracket part. A concave slot 449a shall be formed on the inner circumferential wall of the sleeve 449 along the direction of the longitudinal axis E1 of the second bracket, and the outer circumferential wall 348 of the base is provided with a convex block 348 corresponding to the concave slot 449a along the longitudinal axis B1 of the base such that the engagement of the convex block 348a and the concave slot 449a limits the circumferential rotation of the wheel assembly 400 with respect to the longitudinal axis E1 after the wheel assembly 400 is mounted on the mounting base 34.

The edging mode can be selected according to the use mode of the grass trimmer. When the wheel assembly 400 is connected to the mounting base 34, the axial fixing configuration and the circumferential fixing configuration are adopted at the same time. In this embodiment, the circumferential fixing configuration is suitable for trimming when the wheel assembly 400 is connected to the working head mounting base 34a. The circumferential fixing configuration may also include the interchange of the circumferential fixing configuration between the mounting base 34 and the second bracket part 44, which means that the concave slot is formed on the mounting base 34, while the convex block is arranged on the second bracket. Of course, those skilled in this field can also figure out other structures to limit the circumferential rotation of the second bracket, which is omitted here.

Figure 9:
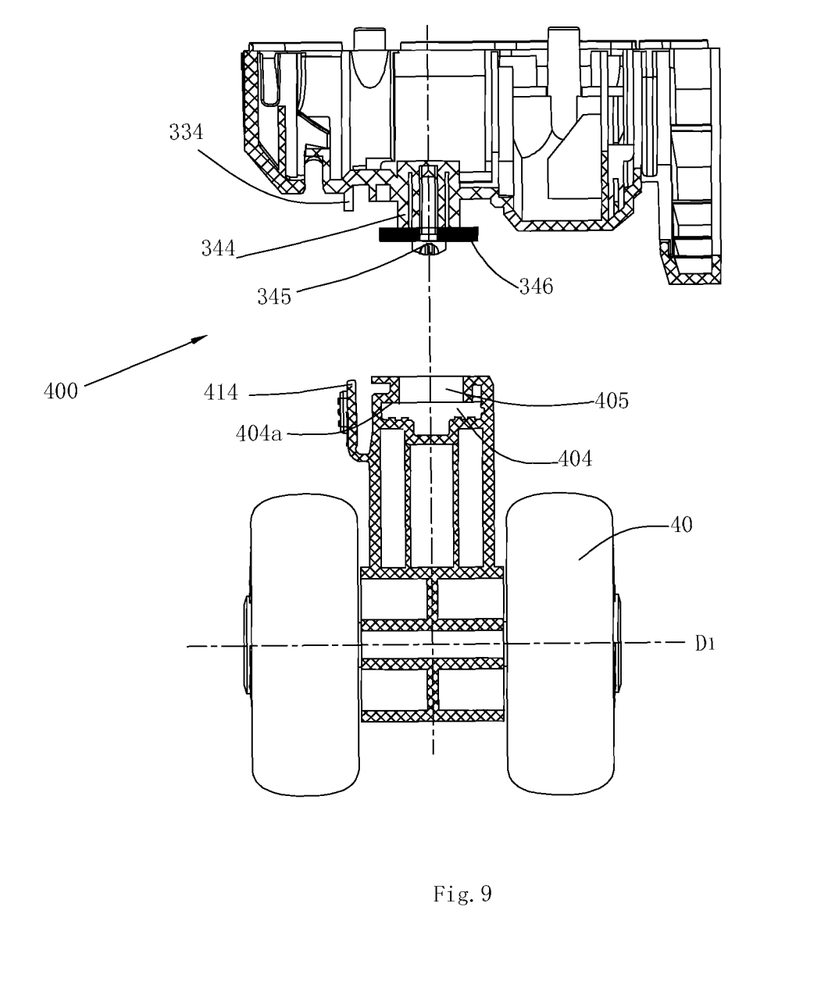
FIG. 9 is a schematic cross-sectional view of a wheel assembly and a mounting base of a grass trimmer according to a third embodiment of the present invention.
Figure 10:
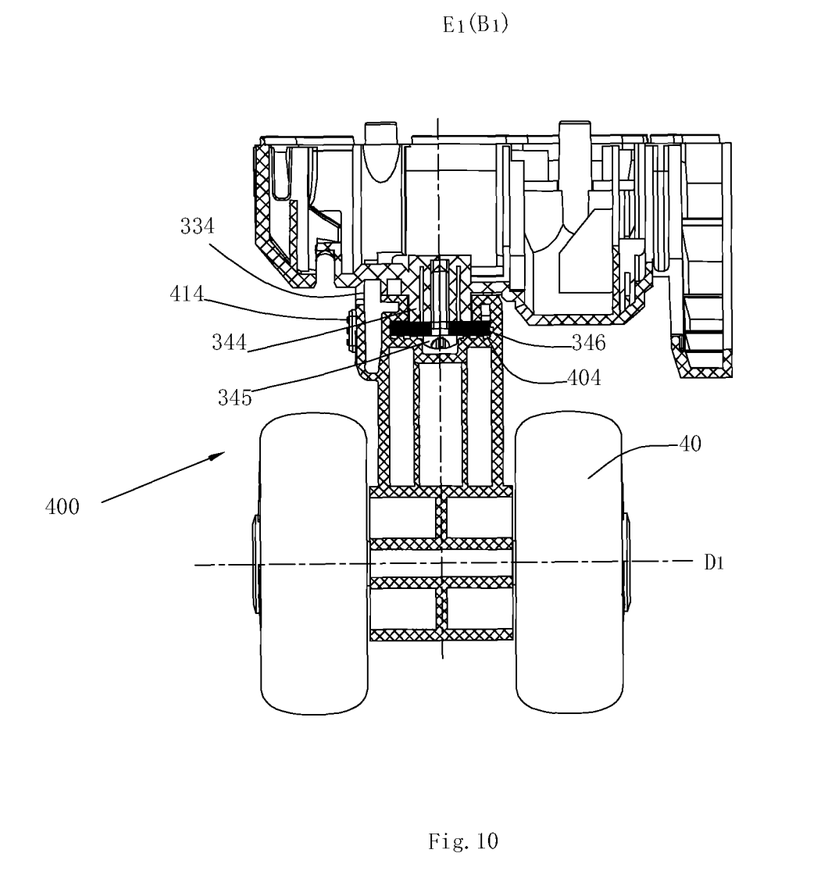
FIG. 10 is similar to FIG. 9, but the bracket of the wheel assembly being mounted to the mounting base.

As shown in FIG. 9 and FIG. 10, in a third embodiment of the present invention, the fixing configuration comprises a bidirectional fixing configuration which limits the axial movement of the second bracket and the mounting base and the circumferential rotation of the second bracket at the same time. The mounting base 34 is provided with a mounting base 34 projection 344 along the longitudinal axis B1. The free end of the mounting base 34 projection 344 is connected with a rectangular fixed plank 346 via a fastener. The rectangular fixed plank 346 extends in the radial direction with respect to the longitudinal axis B1. The radial dimension of the fixed plank 346 is bigger than that of the mounting base 34 projection 344, so a reverse "T" shape is formed there-between. Besides, the mounting base 34 is provided with a clamping block 334 which has a radial distance and a height difference with respect to the fixed plank 346. The second bracket part 44 is provided with a cavity 405 for receiving the mounting base 34 projection 344 at a corresponding position, a sliding track 404 communicated with the cavity 405 and matched with the fixed plank 346 in height for receiving the fixed plank 346, and a buckle 414 engaged with the clamping block 334 for limiting, wherein the part, connected with the sliding track 404, of the cavity 405 is provided with a step surface 404a. When the wheel assembly 400 is adapted to the mounting base 34, the cavity 405 of the second bracket part 44 and the sliding track 404 are respectively aligned with the position of the projection 344 of the mounting base 34 and the position of the fixed plank 346 first; then the mounting base 34 and the second bracket part 44 are adapted by a sliding fit in the direction vertical to the paper surface such that the projection 344 of the mounting base 34 and the fixed plank 346 are respectively received in the cavity 405 and the sliding track 404 completely; the wheel assembly 400 and the mounting base 34 are adapted completely such that the axial movement of the second bracket part 44 with respect to the mounting base 34 is limited by the step surface 404a, and the embedment of the rectangular fixed plank 346 and the sliding track 404 stops the circumferential rotation of the wheel assembly 400 around the longitudinal axis E1 with respect to the mounting base 34. Preferably, to prevent the second bracket from disengaging from the engagement with the mounting base 34, the second bracket part 44 is provided with a buckle 414 pressed against the clamping block 334. The buckle 414 has a certain elasticity and is clamped with the clamping block 334 after the wheel assembly 400 is mounted on the mounting base 34, namely limiting the relative sliding of the second bracket part 44 with respect to the mounting base 34 and therefore ensuring the mounting stability; and by pressing the buckle 414 to disengage from the engagement with the clamping block 334, the second bracket part 44 can slide to disengage from the engagement with the fixed plank 346 along the direction opposite to the mounting direction.

After the bidirectional fixing configuration is adopted to mount the wheel assembly onto the mounting base 34, not only is the axial movement of the second bracket and the mounting base 34 limited, but also the circumferential rotation of the second bracket is also stopped, so the wheel assembly can only roll in one way in the grass cutting and edging modes. Of course, if multiple rolling directions are required, the guard can be provided with several fixed planks in different directions during manufacturing such that the user can mount the wheel assembly on the guard mounting base 34 in a certain direction according to the rotation state. In other words, the longitudinal axis of the first bracket orients different directions at different mounting positions, so the direction of the wheel rotating around the longitudinal axis of the first bracket is also selectable. The bidirectional fixing configuration also includes interchange of structures placed on the second bracket and the mounting base 34, which means that the second bracket is provide with the fixed plank, while the mounting base 34 is provided with the sliding track. The bidirectional fixation is not limited above. For example, the following two kinds of bidirectional fixation can also limit the axial movement and circumferential rotation: pins symmetrically placed on the outer circumference of the second bracket or the mounting base 34 and the L-shaped open slots symmetrically placed on the circumference of the mounting base 34 or the second bracket, the internal screw threads placed on the mounting base 34 or the second bracket and the external screw thread placed on the second bracket or the mounting base 34, which similar to the fastened mounting means and threaded mounting means. Of course, the circumferential fixing configuration can also be replaced by other structures put forward by those skilled in this field, which is omitted here.

When the grass trimmer implements the grass cutting or trimming operations, the wheel assembly is selected to be mounted on one of the mounting bases, and then the other mounting base is exposed in the working environment, which is easy to be covered with grass segments during grass cutting and cause difficulty mounting the wheel assembly and the mounting base. Preferably, the grass trimmer is also provided with a cover which is detachably connected to the other mounting base to effectively avoid the above mentioned problem when the wheel assembly is adapted to one of the mounting bases.

It is to be understood, however, that even though numerous characteristics and advantages of the present disclosure have been set out in the foregoing description, together with details of the structures and functions of the embodiments, the disclosure is illustrative only; and that changes may be made in detail, especially in matters of arrangement of parts within the principles of the invention to the full extent indicated by the broad general meaning of the terms in which the appended claims are expressed.

What is claimed is:

1. A power cutting tool, which is operational in either a trimming mode or an edging mode, comprising:
    a housing having a first mounting base;
    a motor accommodated in the housing;
    a cutting assembly driven by the motor to rotate around a first axis;
    a handle assembly;
    an elongated shaft connecting the cutting assembly and the handle assembly;
    a guard mounted to the cutting assembly and having a second mounting base; and
    a single set of wheel assembly configured to be mounted either to the first mounting base or to the second mounting base, wherein the wheel assembly is mounted to the first mounting base in the edging mode and to the second mounting base in the trimming mode such that the power cutting tool is supported by the wheel assembly not only in the trimming mode but also in the edging mode.

2. A power cutting tool as claimed in claim 1, wherein the wheel assembly comprises a wheel having a central axis, the central axis is substantially perpendicular to the first axis when the power cutting tool is operated in the trimming mode and is substantially parallel to the first axis when the power cutting tool is operated in the edging mode.

3. A power cutting tool as claimed in claim 2, wherein the wheel is rotatable in 360 degrees on the ground when the power cutting tool is operated in the trimming mode.

4. A power cutting tool as claimed in claim 2, wherein the wheel assembly further comprises a bracket for fixedly supporting the wheel, the bracket is detachably mounted to the first or second mounting base.

5. A power cutting tool as claimed in claim 4, wherein the guard comprises a cover surface radially extending with respect to the first axis and a surrounding surface extending from the cover surface and forming an angle relative to the cover surface, the first mounting base is mounted on the surrounding surface.

6. A power cutting tool as claimed in claim 4, wherein the bracket comprises a first bracket part having a longitudinal axis and a second bracket part having an axis at a certain angle to the longitudinal axis.

7. A power cutting tool as claimed in claim 6, wherein a fixing element connects the second bracket part to the first or the second mounting base immovably along the axial direction of the second bracket part.

8. A power cutting tool as claimed in claim 7, wherein the fixing element further comprises a circumferential fixing configuration for limiting the rotation of the wheel assembly around the axis of the second bracket part.

9. A power cutting tool as claimed in claim 7, wherein the fixing element comprises a bidirectional fixing configuration for limiting both the axial movement of the second bracket part and the rotation of the wheel assembly around the axis of the second bracket part.

10. A power cutting tool, which is operational in either a trimming mode or an edging mode, comprising:
    a housing having a first mounting base;
    a motor accommodated in the housing;
    a cutting assembly driven by the motor to rotate around a first axis;
    a handle assembly;
    an elongated shaft connecting the cutting assembly and the handle assembly;
    a guard mounted to the cutting assembly and having a second mounting base; and
    a single set of wheel assembly being alternatively detachably mounted to the second mounting base on the guard for supporting the power cutting tool in the trimming mode and to the first mounting base on the housing for supporting the power cutting tool in the edging mode.

11. A power cutting tool as claimed in claim 10, wherein the wheel assembly comprising a wheel having a central axis, the central axis is substantially perpendicular to the first axis when the power cutting tool is operated in the trimming mode and is substantially parallel to the first axis when the power cutting tool is operated in the edging mode.

12. A power cutting tool as claimed in claim 11, wherein the wheel is rotatable in 360 degrees on the ground when the power cutting tool is operable in the trimming mode.

13. A power cutting tool as claimed in claim 11, wherein the wheel assembly further comprises a bracket for fixedly supporting the wheel which is detachably mounted to the first or second mounting base.

14. A power cutting tool as claimed in claim 13, wherein the guard comprises a cover surface radially extending with respect to the first axis and a surrounding surface extending from the cover surface and forming an angle relative to the cover surface, the first mounting base is mounted on the surrounding surface.

15. A power cutting tool, which is operational in either a trimming mode or an edging mode, comprising:
    a housing having a first mounting base;
    a motor accommodated in the housing;
    a cutting assembly driven by the motor to rotate around a first axis;
    a handle assembly;
    an elongated shaft connecting the cutting assembly and the handle assembly;
    a guard mounted to the cutting assembly and having a second mounting base; and
    one wheel assembly being detachable and alternatively mounted either to the second mounting base on the guard or to the first mounting base on the housing, the wheel assembly comprising a wheel having a central axis.

16. A power cutting tool as claimed in claim 15, wherein the central axis is substantially perpendicular to the first axis when the wheel assembly mounted to the second mounting base on the guard and is substantially parallel to the first axis when the wheel assembly mounted to the first mounting base on the housing.

17. A power cutting tool as claimed in claim 16, wherein the power cutting tool is operated in the trimming mode when the wheel assembly mounted to the second mounting base on the guard and the power cutting tool is operated in the edging mode when the wheel assembly mounted to the first mounting base on the housing.

18. A power cutting tool as claimed in claim 17, wherein the wheel is rotatable in 360 degrees on the ground when the power cutting tool is operated in the trimming mode.

19. A power cutting tool as claimed in claim 15, wherein the wheel assembly further comprises a bracket for fixedly supporting the wheel which is detachably mounted to the first or second mounting base.

* * * * *